United States Patent [19]

Flowers et al.

[11] Patent Number: 4,918,262
[45] Date of Patent: Apr. 17, 1990

[54] TOUCH SENSING DISPLAY SCREEN SIGNAL PROCESSING APPARATUS AND METHOD

[75] Inventors: Dale R. Flowers, Atlanta, Ga.; Kevin P. Goffinet, Cary, N.C.; Anthony W. Miles, Raleigh, N.C.; John T. Rowe, Jr., Raleigh, N.C.; Kevin H. Vorhees, Raleigh, N.C.

[73] Assignee: IBM Corporation, Armonk, N.Y.

[21] Appl. No.: 324,778

[22] Filed: Mar. 14, 1989

[51] Int. Cl.⁴ ............................................. G08C 21/00
[52] U.S. Cl. ...................................... 178/18; 340/718; 340/720
[58] Field of Search ................... 178/18, 19; 340/706, 340/718, 720

[56] References Cited

U.S. PATENT DOCUMENTS 4,511,760  4/1985  Garwin et al. ........................ 128/18

FOREIGN PATENT DOCUMENTS 1528581  10/1978  United Kingdom ................. 178/18

Primary Examiner—Stafford D. Schreyer
Attorney, Agent, or Firm—Edward H. Duffield

[57] ABSTRACT

A touch sensing display apparatus having improved electrical signal processing is described. A plurality of signal threshold comparison levels are employed by the electronic signal calculating and processing unit to identify actual touch signals and to exclude extraneous vibration and offset signal components. Static thresholds of comparison are utilized at lower signal levels and a dynamic, signal tracking threshold is utilized at higher signal levels. The apparatus is particularly effective for use in designs employing a suspended CRT display or other display device in which the screen of the display device is directly touched by a user to record selections of information presented or to input graphical or handwritten information.

12 Claims, 9 Drawing Sheets

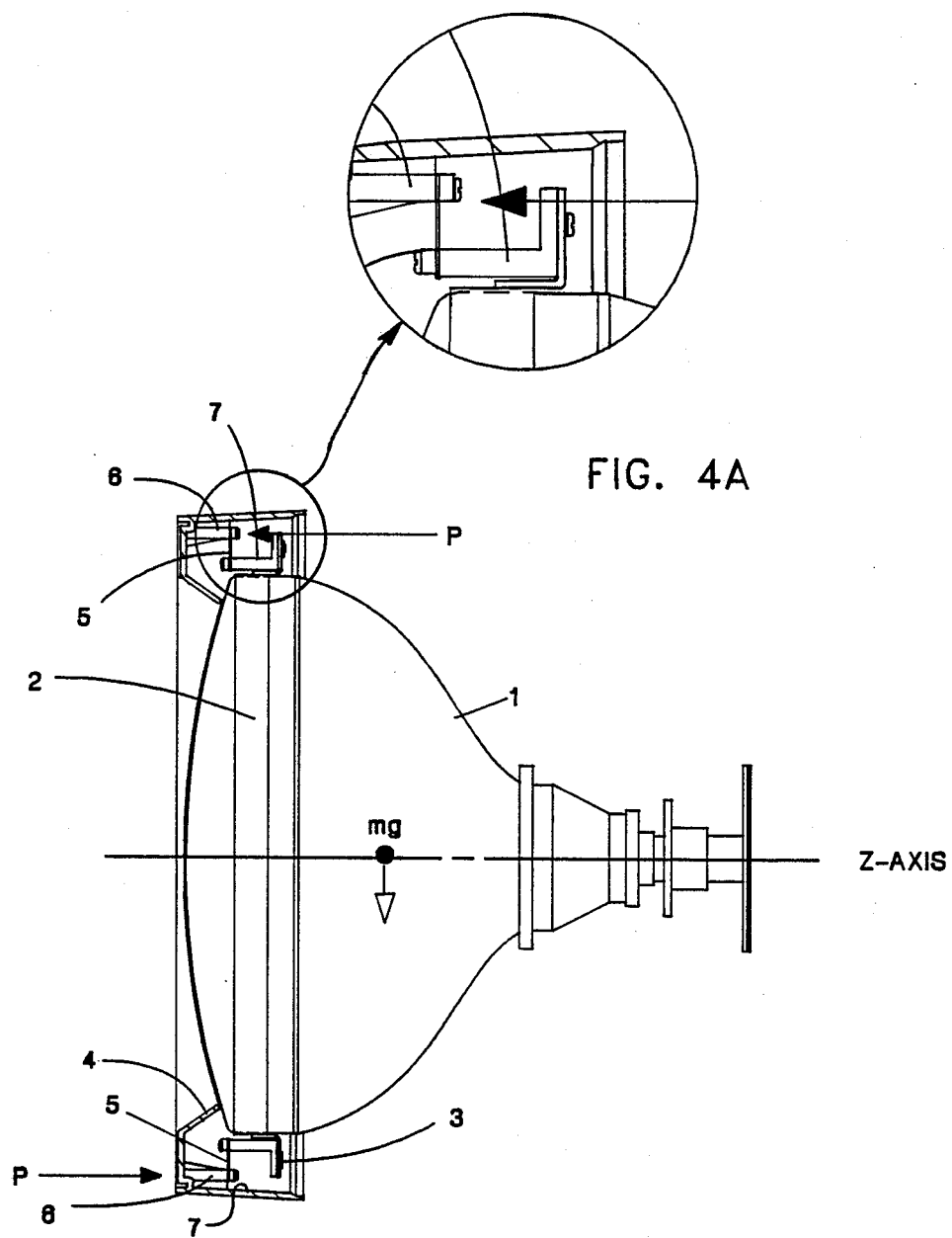

CURRENT FORCE = (CORR CHAN 1 + CORR CHAN 2 + CORR CHAN 3 + CORR CHAN 4)

$$X\ COORDINATE = \frac{(CORR\ CHAN\ 2 + CORR\ CHAN\ 3) - (CORR\ CHAN\ 1 + CORR\ CHAN\ 4)}{CURRENT\ FORCE}$$

$$Y\ COORDINATE = \frac{(COOR\ CHAN\ 1 + CORR\ CHAN\ 2) - (CORR\ CHAN\ 3 + CORR\ CHAN\ 4)}{CURRENT\ FORCE}$$

FIG. 8
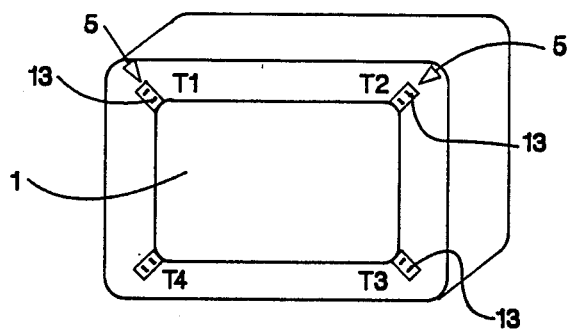
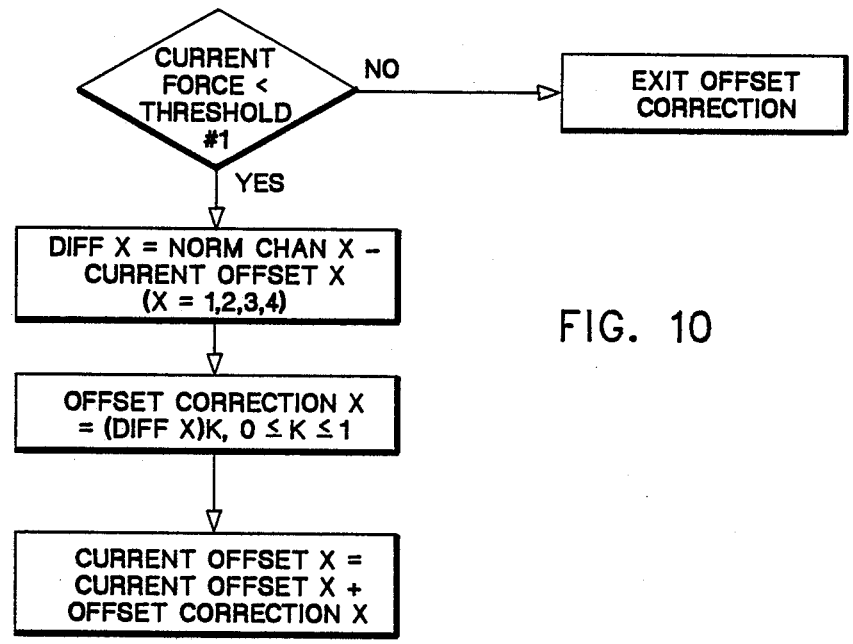
FIG. 10

TOUCH SENSING DISPLAY SCREEN SIGNAL PROCESSING APPARATUS AND METHOD

FIELD OF THE INVENTION

This invention relates to electro-optical user data display screens or systems adapted for the input of data by the user pressing on the display screen itself.

RELATED APPLICATIONS

This application is related to our copending, commonly assigned application Ser. #324,777 filed concurrently herewith which describes the basic mechanism and strain gauge implementation for sensing movement in a CRT display or other similar display mounted within a housing on compliant springs which permit essentially uniaxial displacement of the display screen relative to the housing.

PRIOR ART

A wide variety of prior patents exists in the area of the present invention. The patents of DeCosta et al Nos. 4,340,777 and 4,355,202 show the general type of system in which a display screen may be directly pressed for inputting data to a computer system. The screen element is, however, mounted directly upon piezoelectric sensors which do not produce a static signal output but only detect changes in pressure. The constant signal output voltage that would be an offset or non-active signal voltage resulting from strain gauges and other types of sensors is not encountered. Also, the display screen is borne on the actual piezoelectric sensors in such a fashion that overload pressures applied to the screen actually relieve the sensors of any pressure. Thus high load input forces do not create a signal output problem since no output signal is produced when the force is high enough to eliminate contact between the sensor and the display screen.

U.S. Pat. No. 4,121,049 to Roeber shows a tablet position force and measurement system to be used in conjunction with processing circuitry for analyzing the locus and magnitude of forces presented to the tablet but is not directed to a system in which the display screen itself is the force input element.

U.S. Pat. No. 3,657,475 to Peronneau et al is similar to Roeber and discloses a tablet position indicating and force determining system for static forces applied to a rigid plate. Both Peronneau et al and Roeber have an electronic processing unit for analyzing the plural signals coming from the various sensors of the tablet and for calculating the XY position of applied force and its magnitude in the Z axis. Neither patent, however, has encountered the problem presented when a uniaxial degree of freedom is permitted in the system and the actual display screen itself is displaced slightly by user input pressure. These types of systems thus do not encounter the difficulty with rocking and oscillation in the input screen-sensor assembly.

Hotta et al U.S. Pat. No. 4,389,711 shows another input tablet with processing means for calculating the resultant XY location and the Z axis force component and illustrates various improvements for touch sensitive tablet input systems in which the electronic processing unit incorporates various comparison and logic devices to successfully extract input signals from offset and spurious signal components. However, as with the aforementioned patents, this patent is not directed to a touch input system in which the display panel itself is mounted on spring elements and may be displaced, resulting in oscillation or vibration sensitivity.

Finally, U.S. Pat. No. 4,550,384 shows a touch input tablet in which the tablet is improved by having integral straining sections thereof outfitted with sensors.

In none of the prior art does it appear that the suspension of the display screen device upon compliant springs has been undertaken and the problem which results in the sensitivity of the assembly to oscillation or vibrational forces due to a uniaxial freedom of motion have not been addressed.

Using a spring mounted display screen in which the springs are outfitted with strain sensors poses several problems for the electronic processing circuitry in detecting actual user activity in imposing choices by pushing on the screen of the display device. The weight of the display device itself as suspended on its springs is one cause of the problem since a hard user touch with a quick release will cause the display screen to rock or oscillate in its spring mounting. This in turn causes error signals on the transducers or sensors that result in apparent touch force signals that are analyzed by the system and displayed on the display device at erroneous locations relative to where the actual touch force was applied.

OBJECTS OF THE INVENTION

In light of the foregoing difficulties with the known prior art, it is an object of the present invention to provide an improved electrical calculating and processing circuit apparatus and method for correctly isolating touch forces imposed on an instrumented display screen subjected to user selection choices indicated by forces intentionally imposed on the display device.

Yet another object of the invention is to provide improved electronic sensing and comparison techniques and apparatus for accurately gauging distinctions in the level of force applied to the display screen in order to extract indicia of qualitative or quantitative data intended by the user.

Yet another object of the invention is to provide an improved electronic sensing and discrimination circuit and method which accurately detects light touches or forces and discriminates them from background or offset signals and which is at the same time capable of successfully detecting hard forces or pushes and excluding vibrational or rocking signal components.

BRIEF SUMMARY OF THE INVENTION

The foregoing and still other objects not specifically enumerated are met with the preferred embodiment of the invention by utilizing a plurality of force sensing thresholds of different types in the electronic calculation and processing unit. Plural thresholds are utilized for tracking and/or analyzing the force output signal from the sensors as the sensors monitor forces imposed on the display screen. Two different types of thresholds are employed. A dynamic threshold that tracks the actual touch force is utilized at high force levels. This resolves the problem with spurious signals generated by rocking or vibration of the spring suspended display as a result of high force levels. At low force levels, for example when a user is drawing on the screen of the display device or lightly touching it, dynamic force tracking threshold schemes do not work continuously and may lead to drop out of signal where the touch force falls briefly below threshold. The solution to this aspect is to use a lower fixed threshold. A plurality of other thresholds may also be utilized in a cascaded sequence to detect variations in force level inputs intended by the user to select quantitative or qualitative values about a given selection. For example, selection of an item on a menu may be indicated by a push to at least a first level of intensity and "more of" that item might be indicted by a higher level force.

In addition, the preferred embodiment utilizes digital processing circuitry which enables storage of measured levels for later comparison and analysis against incoming force level signals and which facilitates easy digital filtering of input signals to remove unwanted vibrational components and the like. An improved digital processing circuit with analog feedback for offset correction is employed.

BRIEF DESCRIPTION OF DRAWINGS

FIG. 3 comprising

FIG. 4A illustrates a horizontal cross section of a preferred embodiment showing static loads on the sensors due to the physical orientation of the display device.

FIG. 8 illustrates schematically the placement of transducers on the suspension means in a preferred embodiment.

FIG. 10 illustrates the flow chart for calculating of the offset correction factors as utilized in the preferred embodiment.

DETAILED DESCRIPTION OF INVENTION

Figure 1:
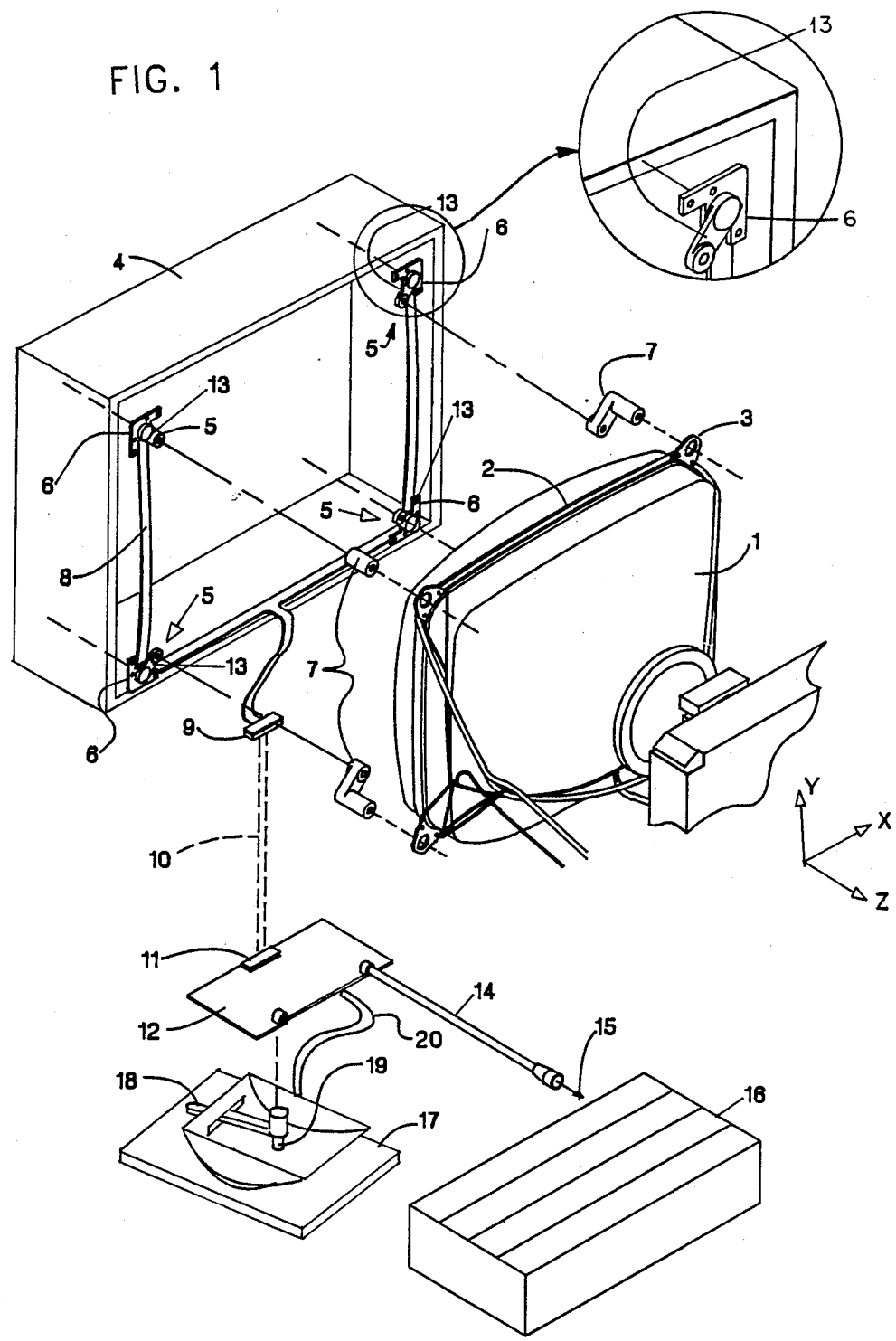
FIG. 1 is an exploded assembly schematic of the basic components of a touch display system according to the invention.

Turning to FIG. 1, a brief overview of the system in which the present invention is implemented will be given. The basic mechanism is the same as that disclosed in our aforementioned, commonly-assigned, co-pending patent application Ser. No. 324,777 filed concurrently herewith. A CRT type of display is used as the example, but as described in the aforementioned application, any electro-optical display device could be utilized instead.

A CRT 1 having a support band or frame 2 with mounting lugs 3 is supported within a housing or bezel 4 by attaching the lugs 3 through clamps 7 to the ends of springs 5 which have their opposite ends affixed by clamps 6 to the frame or bezel 4. Strain gauge sensors 13 are mounted on each of the springs 5. As described in the aforementioned application, the dimensions and material for springs 5 are selected so that the springs will deflect essentially only in a Z axis and allow motion in essentially only that axis, i.e. uniaxially. Electrical leads 8 take the signal from the strain gauges 13 to a connector 9 which may be outfitted with cable 10 and connected to connector 11 on the electrical calculating and processor card 12. Card 12 performs all of the processing, amplification, filtering, threshold analysis, force discrimination and similar operations as described in the present patent application. Its final output over cable 14 consists of X and Y locational data together with the Z force input that has been measured by the strain gauges 13 as processed in the electronic calculating and processing circuitry on card 12. The X, Y and Z input information is provided to port 15 of a computer system 16 for use by the computer system in correlating selected touch input points with given display items on the screen of the display device 1.

A signal lead 20 is connected to the electronic processing card 12 to provide input relative to the change in physical attitude or orientation of the CRT 1. A tilt and swivel mechanism 17 with a position lock 18 and a sensing switch 19 to sense whether the position lock 18 is engaged or not is employed to add one bit of data or information to the processing unit on the processor card 12 indicative of a change in attitude of the CRT as will be discussed in greater detail herein.

Figure 2:
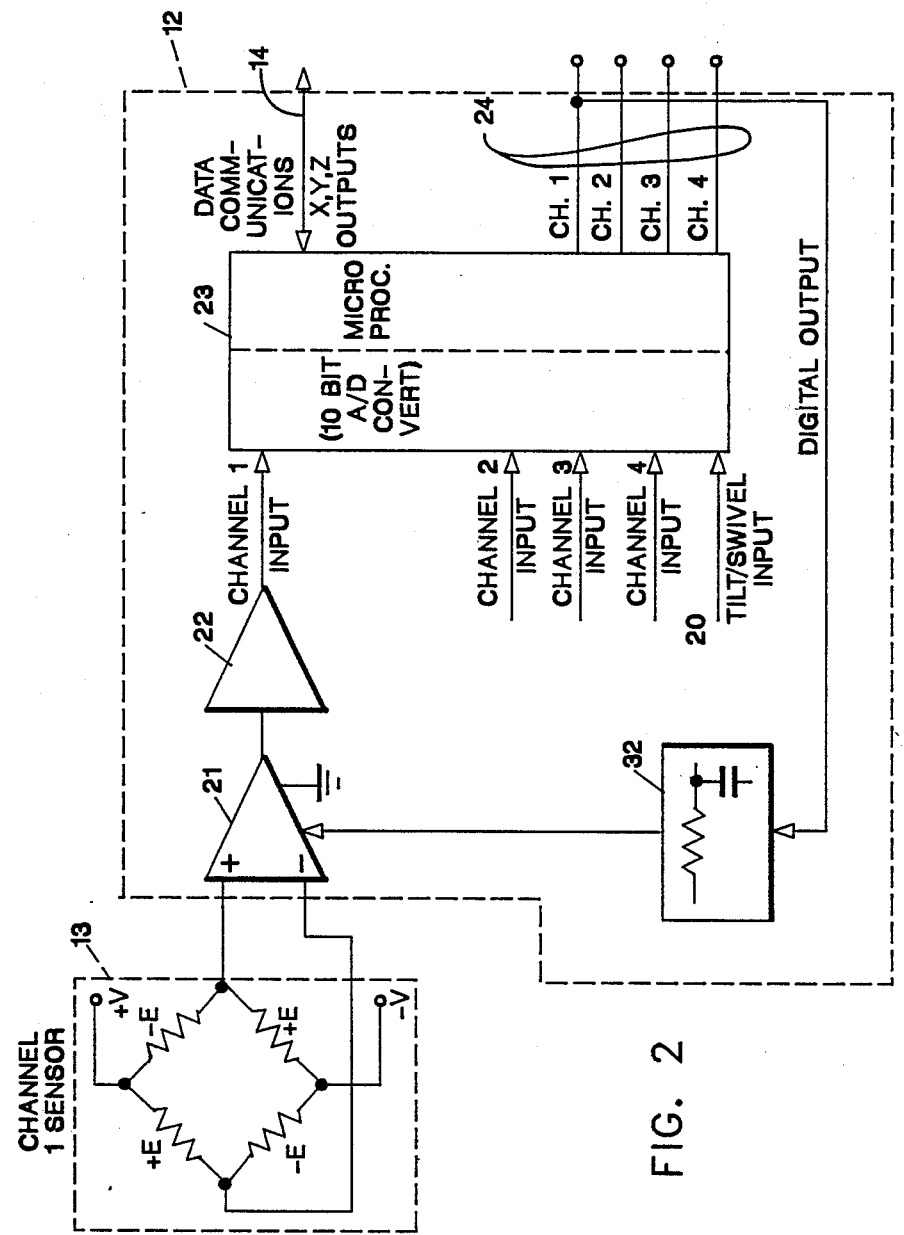
FIG. 2 illustrates schematically the analog and digital processing circuitry of the electronic calculating and signal processing system.

Turning to FIG. 2, the schematic block diagram of the sensing circuitry and processing elements on FIG. 1 is shown in greater detail.

As shown in FIGS. 1 and 8, there are four sets of strain gauge transducers 13, one set located in each corner of the bezel to support the CRT 1. The springs 5 actually support the CRT and the strain gauges 13 are bonded to them as is described in our aforementioned patent application. In the preferred embodiment shown herein, there are four sets of transducers. Each set of transducers consists of four strain gauges connected in a Wheatstone bridge circuit.

In FIG. 2, only a single channel from a single sensor 13 is shown, it being understood that each of the other channels whose input is shown as being connected to the processor 23 would have the same circuitry. Each channel of input to the processor 23 comes from a sensor array 13 on one of the springs 5. Each spring 5 has a plurality of strain gauges 13 connected in a four-legged Wheatstone bridge as shown in FIG. 2. The Wheatstone bridge is supplied with a source of driving voltage at the terminals as illustrated. Each bridge supplies output voltage from the individual sensors to the input of a differential amplifier 21 which is shown referenced to ground. The output of differential amplifier 21 represents one channel of force signals from one of the sensors 13 illustrated in FIG. 1 minus any offset correction voltage which is shown as being applied to the differential amplifier 21. Preferably, the differential amplifier 21 is equipped with a 10 Hz low pass filter to eliminate signal aliasing due to components picked up from commercial AC power supply systems or CRT vertical drive signals. The output of the differential amplifier 21 is fed to a signal gain amplifier 22 also having a low pass filter poled at 10 Hz, whose output is the channel 1 signal input to a 10 bit A to D converter and microprocessor 23. The A to D converter may be a separate unit if desired, but it has been found convenient to use an Intel Corporation 80C196 microcontroller 23 which contains within it a 10 bit A to D converter that conveniently takes the input analog signal from amplifier 22 and converts it into a 10 bit (maximum) digital representation of samples according to a clocking rate that is established internally.

The microprocessor 23 performs all of the threshold measuring and analysis of input signals individually for each channel input, takes account of whether the tilt and swivel switch 19 is open or closed and processes the signals from all the channels to provide data communications at its XYZ output to the CPU 16 over cable 14. It also provides digital representation, at outputs 24, of the DC offset correction signal. Each individual channel output is supplied to a low pass filter, an RC circuit operating as a D to A converter, to integrate the squarewave digital output level of the channel into a rough analog output signal representing offset correction to be subtracted from the input signal from the sensor 13 by differential amplifier 21. This allows the processor to adjust the signal to within the range of the A to D converter. As will be seen from the circuit in FIG. 2, the differential amplifier 21 ground references the bridge output from the sensor 13 for each channel, although only the circuitry for a single channel is shown. The second amplifier 22 further increases the signal amplitude. Both of the amplifier stages 21 and 22 incorporate a lowpass filter to prevent signal aliasing from induced voltages from the AC commercial supply circuitry normally present in the environment. However, the primary pass band characteristics of the signal are established by digital filtering implemented within the microprocessor 23.

The signals provided to the microprocessor 23 are sampled at the A to D converter contained within the microprocessor. The A to D converter has a 10 bit effective resolution.

Unlike many Wheatstone bridge circuits, this bridge circuit requires no manual trimming. Software within the microprocessor 23 performs a two stage offset correction automatically as will be discussed in greater detail herein. The first or coarse level of offset correction, is applied by the microprocessor 23 through its outputs 24 integrated by a low pass RC digital to analog converter. The digital to analog converter is actually implemented utilizing a low pass RC filter circuit that converts the digital periodic squarewave resulting from the duty cycle of the high speed digital outputs of the processor 23 into an analog signal proportional to the duty cycle. This is a very low cost method of implementing a D to A converter and one of these circuits is supplied for each of the four channels, only one of which is shown.

Because the CRT is spring mounted, it can experience excursions both "into" and "out of" the plane of its nominal at rest position. These are defined for convenience as "positive", i.e. "into", or "negative", i.e. "out of", the plane. This stage of correction brings the input signal to near a nominal operating point lying in the A to D convertor range which provides latitude for negative signals. This provides an operating point that permits negative sensor excursions to be accurately tracked and compared with positive excursions. Fine offset corrections are performed in the software continuously when no touch forces are detected on the screen.

Figure 3A:
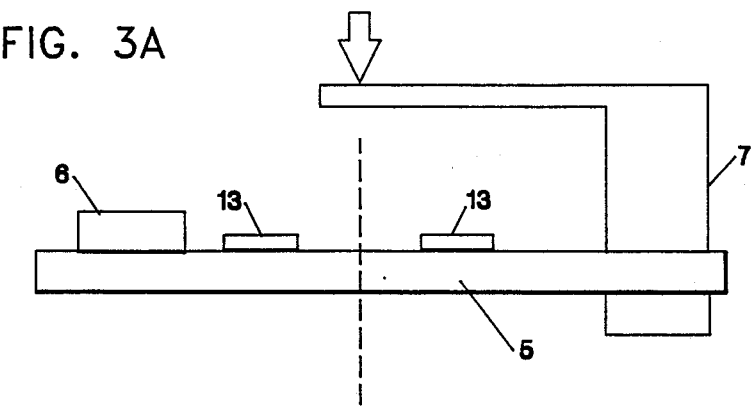
FIGS. 3A through 3C illustrates schematically the electronic configuration and placement of each sensor as employed in the preferred embodiment.
Figure 3B:
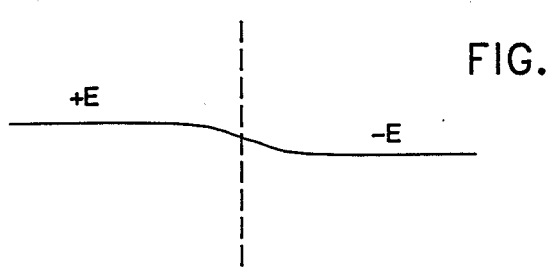
Figure 3C:
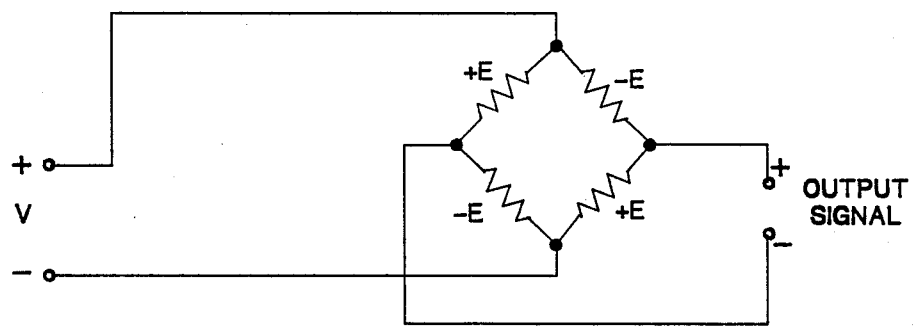

FIG. 3 comprising FIGS. 3A through 3C schematically shows how the strain gauges 13 are placed on a spring 5 between clamps 6 and 7 to experience a general S-shaped deformation if a force F is applied as shown. The strain gauges at the left of the center line in FIG. 3A will experience tension forces and those to the right will experience compression forces resulting in plus and minus signals as shown. As shown in FIG. 3C, the strain gauges 13 are connected together to form a full Wheatstone bridge with extension sensors diagonally opposite one another in the circuit and compression sensors diagonally opposite one another to provide the output signal as shown. A power supply of DC voltage is illustrated in FIG. 3C as merely plus/minus V and the output signal as shown in FIG. 3C are the outputs to the differential amplifier 21 in FIG. 2.

Figure 4B:
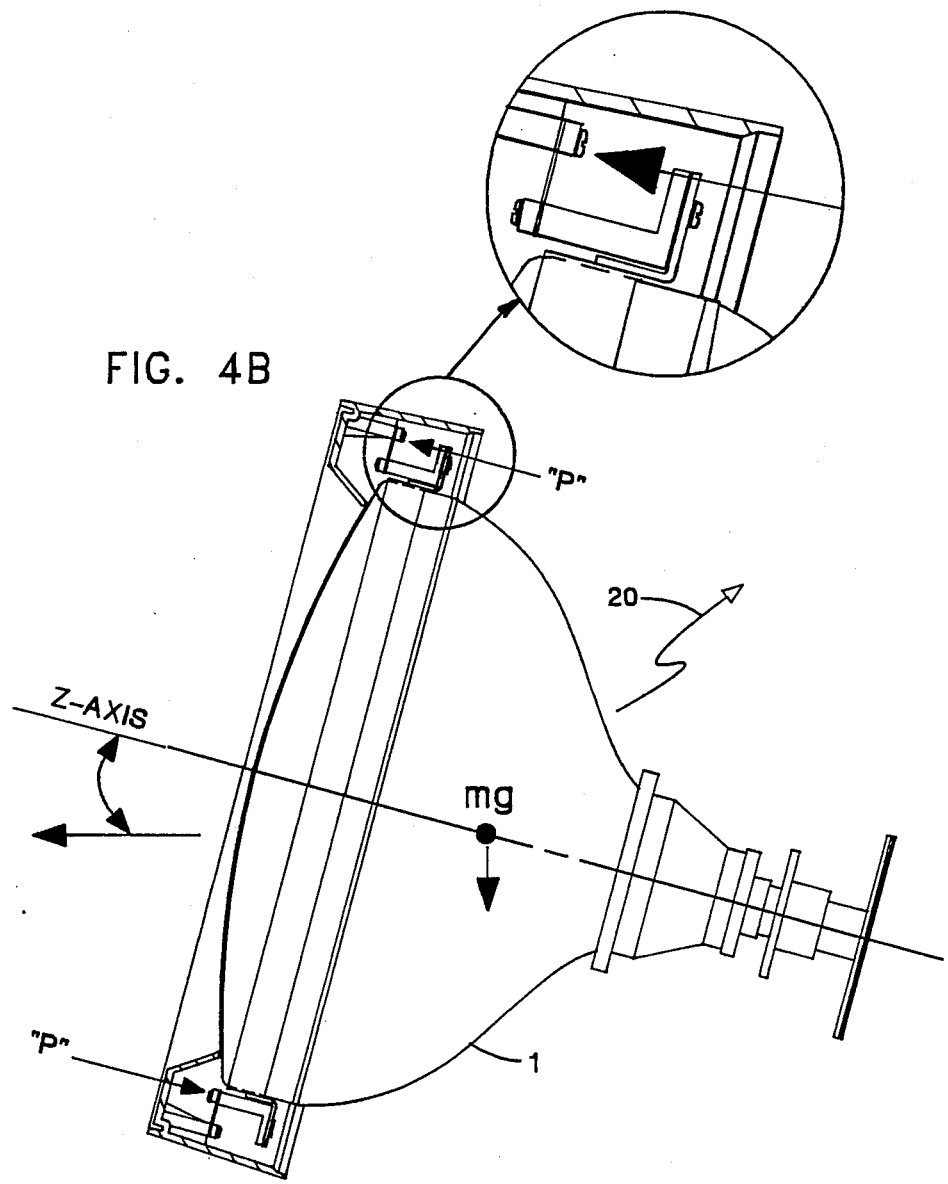
FIG. 4B illustrates the variation in static loads occasioned by reorienting the physical position of the display device in FIG. 4A.

As noted with regard to FIG. 1, a CRT or other type of electro-optical display may be employed and the display is physically mounted on springs 5 which impart strain to sensors connected therewith. FIG. 4A illustrates that the weight of the display device such as a CRT 1 will result in a moment MG about its center of gravity which must be borne by the springs 5. A preload will thus exist under static conditions due to the weight of the CRT 1 acting about its center of gravity MG as shown. This will increase the load on the top spring 5 and decrease the load on the bottom spring 5. However, if the CRT 1 is tilted in its tilt swivel mount (not shown here, but apparent in FIG. 1), the preload conditions change entirely and may increase or modify the signal output voltages from the sensors 13 on each spring 5 to the point that they are out of range of sensing or might be erroneously sensed as touch signals. This is overcome in the present invention by providing, as shown in FIG. 1, a tilt swivel lock switch 19 activated by the tilt swivel lock mechanism 18 that supports the CRT 1. This provides an input bit of information to the processor circuitry in the microprocessor 23 as shown in FIG. 2. Thus if the operator unlocks the tilt swivel mechanism by unlocking the lock 18, switch 19 will sense this fact and processor 23 can be programmed to ignore force signals that are apparent until the lock 18 is closed again. After the tilt swivel mechanism is again in its locked position and the screen is determined to be inactive, outputs 24 are adjusted so as to preserve the full range of the A to D converter. Alternatively, gravitationally operated sensing switches, mechanically connected potentiometers, mercury filled switches or any of a variety of mechanical, optical or magnetic sensors could be employed to detect a change in physical orientation of the long axis (the Z axis) of the display. A signal from any of these devices could similarly be fed to the processor 23 for the same purpose as described above.

The operation of the microprocessor 23 and its inherent A to D converter in the preferred embodiment will now be described. The processor 23 is supplied commercially with an internal port scanning function so that up to 8 channels may be individually sampled by the A to D converter. As each channel is selected, the A to D converter converts the analog input into a 10-bit digital signal sample which is processed by the processor 23. The processing includes subtraction of any offsets for temperature compensation of the sensors, physical orientation of the display screen, vibration, random noise and the like as will be described later. The microprocessor is also programmed with an internal digital signal filter with an adjustable cutoff frequency. Calibration gain constants which account for mechanical and electrical sensitivity tolerances, are then applied to the digital signal for all four channels and the resulting data are used with the normal static torque balance equations employed in the known art to calculate the X and Y coordinate locus of applied force input and to generate the sum of forces as the Z coordinate force data for output to the CPU 16. Internally, the microprocessor 23 compares the Z coordinate sum of forces to internally defined thresholds or reference levels to enable the system to isolate and define the activities implied to be occurring on the surface of the display screen 1.

Figures 6, 7:
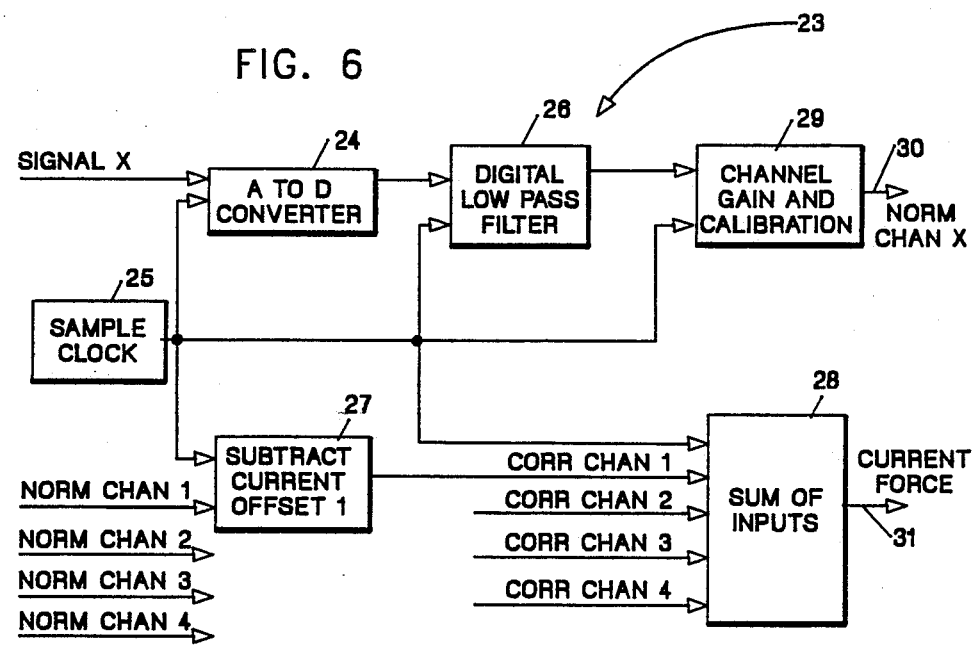
FIG. 6 illustrates schematically the internal flow for processing of signal inputs through a digital processor in accordance with the invention.
FIG. 7 illustrates the equations utilized in calculating the total current force and the X and Y coordinates for the application of the force in response to sensor input signals.

FIG. 6 illustrates in block form the internal structure and operation of the major portion of the microprocessor 23 as it is employed. Incoming signals are shown for only one of the channels as illustrated in FIG. 2 so that FIG. 6 should be understood to be applicable for each of the other three channels, although the path for only a single channel is illustrated. In FIG. 6, incoming channel signals identified as "signal X" are applied to the A to D converter 24 which samples the input signal X at instants determined by the sample clock 25. The digital output of the A to D converter 24 is applied to a digital lowpass filter 26 to exclude higher frequency components of the signal due to environmentally induced vibrations and oscillations in the sensor system induced by the mass of the CRT as affected by foot traffic and noise, etc. and also as results from instantaneous electrical disturbances picked up in the sensors. The output of the lowpass filter 26 is applied to the channel gain and calibration stage 29 which will increase or decrease the digital representation of signal level to a normalized channel output level 30 as will be described later.

The normalized channel output 30 is also applied to the offset subtraction stage 27, there being one for each channel but only one channel is shown. An offset value that accounts for thermal drift of the sensors, static loads due to orientation of the display and its weight against the springs, electrical drift and amplification errors is subtracted from the normalized channel output. This provides the corrected channel output signal which is clocked into the summation circuit element 28 to form the sum of inputs that represents, at 31, the corrected measurement of current force in the Z axis.

FIG. 7 illustrates the calculations performed in the microprocessor 23. The current force is actually the summation of the corrected channel values supplied to the input of the summation element 28 in FIG. 6. The X coordinate and Y coordinate calculations are performed utilizing the normal torque balance static force equations known in the art. The location of the sensors and their numbering is as shown in FIG. 8 with channels T1 and T2 being at the top of the display 1, T3 and T4 being at the bottom. The X and Y coordinate equations in FIG. 7 thus refer to the location of the sensors as depicted in FIG. 8 with channel 1 being sensor T1, channel 2 being sensor T2, etc.

Returning now to FIG. 5, a discussion of the logical operations performed within microprocessor 23 on the normalized channel signal 30 and on the current force signal 31 in order to calculate initial offset values and to make corrections to the offsets as well as to perform touch sensing discrimination logical operations will now be given.

Figure 5:
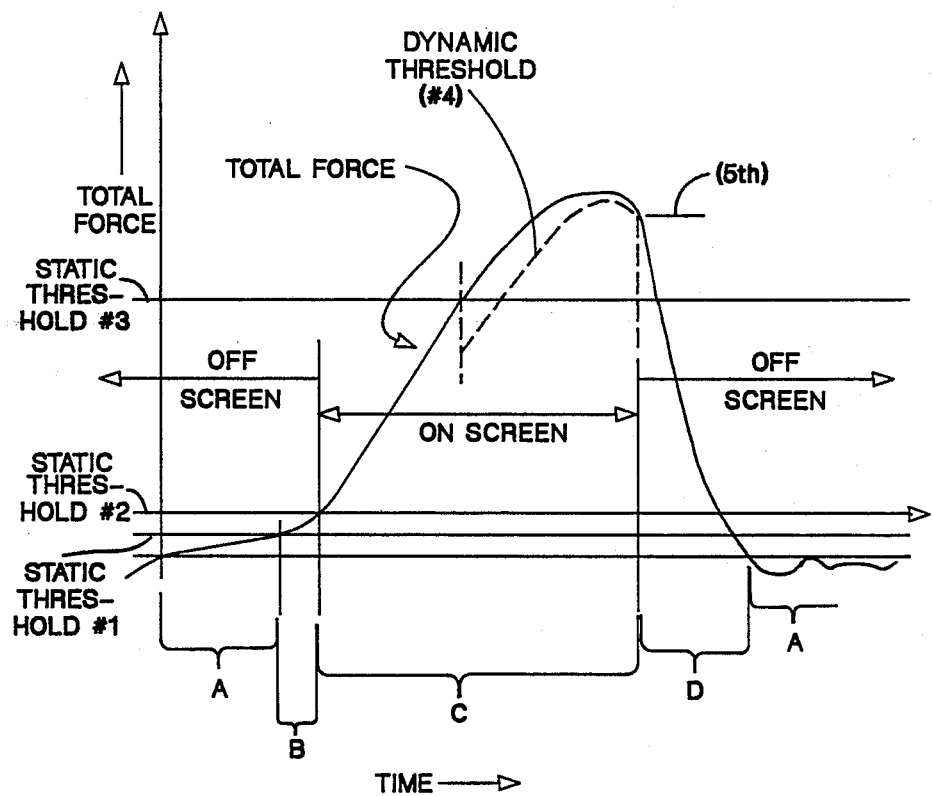
FIG. 5 illustrates the touch discrimination thresholds and their application to analysis of incoming force signals in a preferred embodiment of the invention.

In FIG. 5, the total force output signal, called "current force 31" in FIG. 6, is graphically depicted as the tracing of total force versus time for an assumed abrupt high level push and release by an operator against the screen 1. Several static thresholds, which are force values stored in the memory of the microprocessor 23, are also illustrated in FIG. 5. The thresholds aid in resolution of the total force signal and in discriminating it from spurious signals or other non-touch signal components. A plurality of static and some dynamic thresholds are illustrated and their application will now be described.

Figure 9:
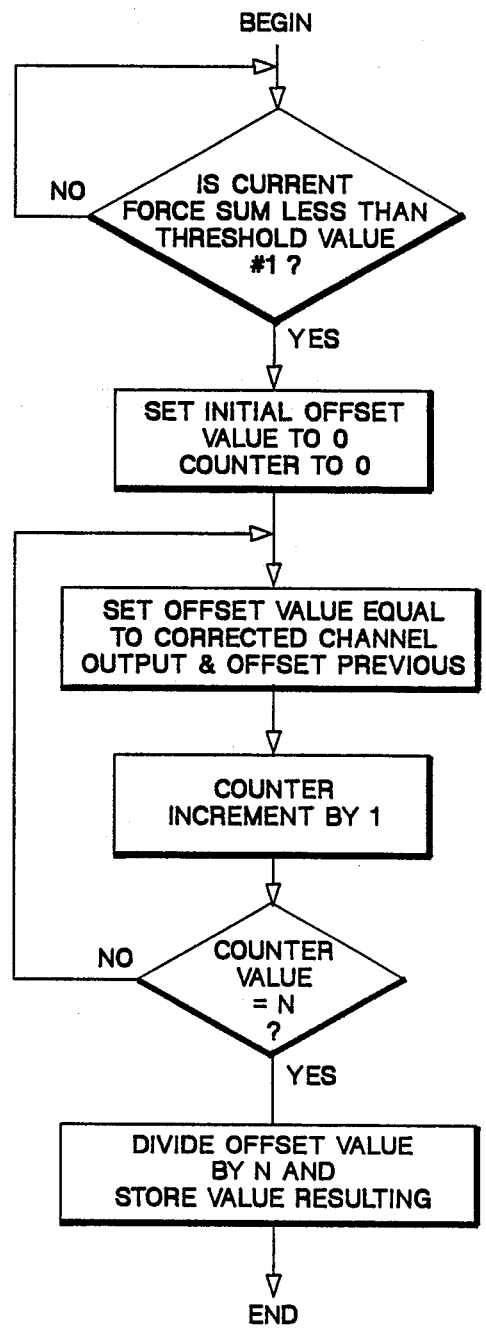
FIG. 9 illustrates a flow chart used in calculating initial offset values in the processor according to the invention.

As the force level signal rises beginning from time 0 in FIG. 5, it is compared against the first static threshold level as depicted schematically in a flow chart in FIGS. 9 and 10. In FIGS. 9 and 10, the beginning of the process is to compare the current force output level, which is the sum of the channel signals, against a fixed threshold value stored in the memory of the microprocessor as threshold 1. Threshold 1 is set to a force level which is less than that of the normally provided signal from the lightest human touch which is to be sensed. It is in this range identified by the letter A in FIG. 5 that offset signal values are acquired for use in the microprocessor 23. In FIG. 9, the first step compares the current force level to the stored first threshold value, and if the force level is less than the stored value, the initial offset values are set to 0 and a counter is initialized to 0. Next, the offset value is set equal to the corrected channel output level plus the stored value of the previous level of the offset signal. Since the offset signal has been initialized to 0, the first pass through this routine adds 0 to the corrected channel output signal level. The meaning of this is that the corrected channel output signal level is interpreted to be a non-touch signal level, i.e. one due to thermal, static load, and electrical drift characteristics that are not to be attributed to actual loads imposed on the display by human applied pressures. Next, in FIG. 9, the counter is incremented by one and then the value of the counter is compared to an ending value which is arbitrarily set at N. If the count has not reached the value N, the procedure is continued to reset the offset value equal to the corrected channel output plus the stored offset. This will be essentially adding the corrected channel output to itself. The process will continue N times whereupon, the counter value equal N will be reached and the numerical average of the N samples of the corrected channel output will be formed and then stored as the existing offset value to be used by the microprocessor so long as the current force output is higher than the threshold value 1 in FIG. 5.

In FIG. 5 a second static threshold is also indicated at a signal level higher than the offset or first static threshold level. The current force summation is compared against the second threshold as well and, if the current force exceeds the second static threshold, it is interpreted as the beginning of a touch force signal. In the region in FIG. 5 denoted as B, the signal level has not reached the second threshold and touch is not recognized by the microprocessor. However, since the first static threshold has been exceeded, the offset is not updated. In the zone depicted as zone C in FIG. 5, the force level is above the second static threshold level and it is designated as "on screen" meaning that operator's finger or stylus has been detected as being on the screen and applying some pressure more than the minimum second static threshold level.

Now a problem condition arises with CRTs or other display elements mounted on springs such as those in FIG. 1 in that a hard push or touch followed by a quick release may allow the system to oscillate briefly. This, in turn, yields numerous input forces of varying levels which tend to cause the display, which indicates the resulting XY coordinates, to display an undesirable moving locus of force. The present invention solves this problem by applying a third and fourth threshold to the total force signal. The third static threshold is depicted in FIG. 5 and is used internally by the microprocessor 23 to determine the time when a dynamic threshold, the fourth threshold indicated in FIG. 5, should be generated and used for comparison against the total force signal. The third static threshold is at a value several times that of the second static threshold which means that a force several times the minimum has been detected as being applied to the screen. When the third static threshold has been exceeded by the total force signal, it is an indication that a hard push has been sensed. To overcome the potential difficulty if a hard push is experienced followed by a quick release, a dynamic threshold, the fourth threshold in FIG. 5, is instituted by the microprocessor 23. When the static threshold has been exceeded, the microprocessor 23 will calculate a fixed percentage of the total force by multiplying the current force signal level by a factor K lying in the range of 0 to 1 which is then stored for the instantaneous signal sample on which it is made and used as the comparison threshold, i.e. the fourth or dynamic threshold for the next total force sample at the next clock time in microprocessor 23.

As can be seen from FIG. 5, as long as the total force continues to rise, the dynamic threshold tracks at one or more sample times behind the input total force signal level and, since the total force signal will exceed the dynamic fourth threshold so long as the signal level is rising, constant, or decreasing slowly, the microprocessor continues to detect an on-screen pressure. However, when the operator suddenly releases pressure, as shown by the rapid decrease in FIG. 5 of the total force signal, an instantaneous sample of the falling signal will fall below the trailing dynamic threshold 4. A fifth threshold will have been reached as shown in FIG. 5 and it is defined by the fact that the signal output has fallen below the fourth threshold. At this point, microprocessor 23 interprets the signal level (which is still far above the static threshold 2 at which touch was detected) as being release of pressure, i.e. "end of touch" and that the finger or stylus is "off screen", thus ignoring the remainder of the touch force signal as it falls back toward the third, second and first static threshold levels. The signal in zone D is ignored and it is only when the signal level finally falls below the first static threshold level as shown in the second zone A to the far right hand abscissa in FIG. 5, that threshold values are again calculated.

Returning to FIG. 6 and FIGS. 9 and 10, correction of the offset calculation is also performed. With passing time, the offset values change because of variations in temperature, static load, orientation of the display screen on its mounting, and the like. As with initial offsets that were calculated as described in FIG. 9, the changes in offsets must also be accounted for so that the offset values can be corrected. If this is not done, deciding between actual screen actuation by touch and a screen being lightly touched will become very difficult if not impossible. In the present invention, this ongoing correction of the offset levels is accomplished by not updating offset values all at once, but by slowly adapting them to the input signal. This is based on the premise that offset signals are very low frequency signals and will change but slowly. The equations necessary for the adjustment are described now and are implemented in the processor 23 within the block 27 as shown in FIG. 6.

First the existing offset correction is calculated. It is initially the normalized channel output minus the initial offset correction which is stored in memory. The resulting difference is multiplied by a factor C lying in the range of 0 to 1. C is the factor that describes how quickly the offsets will be adapted and the larger the value of C becomes, the quicker the adjustments are made. Next, the final offset value, i.e. the corrected offset value, is set equal to the initial offset plus any offset correction calculated with the factor C times the difference between the normalized channel output and the initial offset as noted above. Finally the initial offset value stored in memory is set to the calculated final offset correction value. As an example, consider the following: if an initialized normalized channel output signal in some arbitrary unit of measurement were 116 units, and the initial offset signal level stored in memory was 100 units, then the corrected channel output would be 16 units, i.e. the normalized channel signal level minus the initial offset. The offset correction factor would be the normalized channel output (116) minus the initial offset level (100) times the C factor. Let us assume for this example that C has chosen equal to 0.5. Thus the offset correction to be applied to the initial offset value will equal 8 and the final offset value will be 108 instead of the original 100. The process may be repeated, and it will be quickly understood that the final offset values will finally approach the normalized channel output if the normalized channel output is stable over time.

Of course, if the screen is not being touched, i.e. if the signal level that is the corrected channel output in FIG. 6 falls to 0, then the offset correction using the above equation or process will also be 0 and the offsets will not be adjusted. The offset adjustment threshold is the first threshold shown in FIG. 5. Below it, so long as a signal is present, offsets are calculated and adjusted. Above the first threshold in FIG. 5, offset correction does not take place.

FIG. 10 illustrates the process of calculating offset corrections.

First the normalized output signal minus the initial offset from memory is calculated and is stored as the difference "diff". The difference is multiplied by a factor C to generate an offset correction factor and then a new offset is calculated equal to the initial offset plus the offset correction factor which may be positive or negative. Next the initial offset is set equal to the new offset and the process is repeated. The value of C can be chosen anywhere in the range of 0 to 1 and the closer to 1 that C is chosen the more rapidly the offset correction will approach the normalized channel output itself.

Returning briefly to FIG. 5, it can be seen that the variety of thresholds employed enables a very fine distinction to be drawn between levels of force and the associated meanings ascribed thereto. So long as the total force lies below the third static threshold at which high force dynamic thresholding is invoked, the second relatively low static threshold is used to sense onscreen versus offscreen condition.

So long as the force exceeds the second static threshold in FIG. 5 but is below the third static threshold, light touches will be accurately distinguished from "no touch" or "offscreen" conditions. A heavy or hard touch will be accurately detected in a dynamic threshold invoked when appropriate as noted above.

A possible additional application of multiple static thresholds also exists. In this case, various quantitative or qualitative factors might be associated therewith. For example, if a user were confronted with a display of menu items, merely giving a light touch to one of the menu items on the display would be recognized by the XY and Z signals produced by the microprocessor 23 and passed to the CPU 16 in FIG. 1. The CPU would interpret the X and Y location and the Z force signal as being the "selection" of a given item identified at an X and Y location. If the identified location does not change but the force continues to increase, one possible application of this piece of information is to interpret it as a user's desire to select "more" of the selected item or to "go faster", "turn brighter", "expand", "contract" or any other variable that might be associated with a given displayed item selected by the user and then exposed to a harder and harder selective push. The use of multiple detection thresholds is easily implemented in a microprocessor such as microprocessor 23 and could thus be utilized to advantage with this technique.

If the force is too hard, one or more of the channel sensor signals will reach its maximum, i.e. an output will be reached that is the maximum that can be obtained from the A to D converter. If this occurs, it can be detected in the microprocessor 23 by instituting what is effectively yet another threshold level on the corrected channel signal level. If such a condition is detected for a given channel, the microprocessor can be instructed to hold all channel signal levels where they were, ignoring any higher or subsequent signal levels and utilizing a fixed value for the signal levels in the calculations for X and Y values. This alleviates a potential problem when a heavy touch force is experienced near one of the corners of the display screen, i.e. near one of the sensors which would potentially overload that A to D channel but not its other three companions in the other corners. Under such a condition, the apparent levels from the other three sensors will continue to change while that of the overloaded channel will not. The result in the torque balance equations will be that the locus of force will be calculated to have moved even though the user has not moved his or her finger but is pressing harder and harder. Fixing or freezing the X, Y and Z output values and ignoring further calculation until the signal level falls back within normal range alleviates this problem.

Also, while it has not been illustrated, a fifth sensor could be implemented and attached to a separate spring mount holding a separate mass and affixed to the chassis of the display device to monitor vibrations and impact loads experienced by the entire display apparatus. Such a sensor's signals can be used in the processor for the display apparatus to correct the primary sensor channels signals due to such vibrations and impacts. Such signal contributions to the primary channels may be cancelled out or ignored by the microprocessor 23 by simply monitoring the fifth channel which is sensitive to environmentally induced signals.

In addition, as has been alluded to earlier, the digital microprocessor 23 can easily be programmed with digital filtering to ignore components of signals in high frequency ranges that would not result from ordinary finger force application to the display system. The use of digital signal processors which implement digital filters of this nature is commonplace in the signal processing industry and need not be described further herein.

Having thus described our invention with respect to a preferred embodiment thereof, it will be apparent to those of skill in the art that numerous threshold levels of discrimination on the output force signals might be employed for a variety of purposes and that the signal force calculation and processing could be performed by means other than the digital microprocessor as described. For example, the signals might be fed directly to the CPU 16 in FIG. 1 which could implement the processing required, albeit at greater cost and inconvenience. This would not be a departure from the nature, spirit and scope of the invention and is therefore intended to be included within the coverage of the claims as follows:

We claim:

1. In a touch sensing display apparatus having a display means, a frame, suspension means supporting said display means in said frame in a manner permitting uniaxial displacement of said display means relative to said frame, a plurality of electrical sensors connected with said suspension means and providing electrical signal outputs in response to displacement of said display means, and an electrical signal processing means connected to receive the electrical signal outputs from said sensors, the improvements comprising:

each of said electrical sensors comprises a plurality of strain sensors electrically connected together in a Wheatstone bridge configuration and supplying electrical signal outputs therefrom; and differential amplifier means receiving as inputs the output from said Wheatstone bridge and an offset compensation signal, said differential amplifier providing as an output an amplified signal representative of the difference in voltage between its input; and an analog to digital converter means connected to receive the output of said differential amplifier means, said analog to digital converter means supplying a digital output representative of the signal level received at its input; and a digital microprocessor connected to receive said digital output representation from said analog to digital converter and for providing digital outputs representing the locus and magnitude of forces imposed on said display means and to provide digital offset compensation signals; and a digital to analog conversion means connected to said microprocessor to receive said digital offset compensation signals therefrom for conversion into analog offset compensation signals supplied to said differential amplifier means.

2. Apparatus as described in claim 1, wherein: said digital to analog conversion means comprises a low pass analog filter.

3. Apparatus as described in claim 1, wherein:

groups of said strain sensors are connected to said suspension means at a plurality of locations associated with the dimensions of said display means in orthogonal axes perpendicular to the said axis of uniaxial displacement of said display means; and the outputs of each group of said groups of strain sensors being connected as separate input signals to said differential amplifier means; and said differential amplifier means providing separate output signals to said analog to digital converter means corresponding to each of said groups of strain sensors; and said analog to digital means providing separate digital outputs to said microprocessor means; and said microprocessor means providing a plurality of separate digital outputs representative of the locus of forces imposed on said display means in said orthogonal axes and of the magnitude of said forces on the axis of uniaxial displacement permitted by said suspension means.

4. Apparatus as described in claim 2, wherein:

groups of said strain sensors are connected to said suspension means at a plurality of locations associated with the dimensions of said display means in orthogonal axes perpendicular to the said axis of uniaxial displacement of said display means; and the outputs of each group of said groups of strain sensors are connected as separate input signals to said differential amplifier means; and said differential amplifier means providing separate output signals to said analog to digital converter means corresponding to each of said groups of strain sensors; and said analog to digital means provides separate digital outputs to said microprocessor means; and said microprocessor means provides a plurality of separate digital outputs representative of the locus of forces imposed on said display means in said orthogonal axes and of the magnitude of said forces on the axis of uniaxial displacement permitted by said suspension means.

5. In a touch sensing display apparatus having an electrical signal processing means comprising a digital microprocessor and a display apparatus having a display means, a frame and a suspension means supporting said display apparatus in said frame and permitting uniaxial displacement of said display means relative to said frame and a plurality of electrical sensors providing electrical signal outputs in response to the uniaxial displacement of said display means, the further improvements comprising:

means for forming the sum of forces in said uniaxial axis direction from the outputs of said plurality of sensors; and means for comparing said sum of forces with a first static threshold value which, if not exceeded, indicates that the sum of forces is an offset signal value to be stored; and means for comparing said sum of forces with a second static threshold value which, if exceeded by said sum of force values, indicates that an intentional force has been applied to said display means; and means for comparing said sum of forces with a third static threshold value which, if exceeded by said sum of forces, indicates that a dynamic intentional force has been applied; and means responsive to said sum of forces exceeding said third threshold value for comparing said sum of forces to a proportion of a recent value of said sum of forces as a dynamic threshold value therefore.

6. Apparatus as described in claim 5 wherein:

said first, second and third threshold values are distinct from one another, have magnitudes arranged in ascending order and are such that said first value is the smallest and said third value is the largest thereof.

7. Apparatus as described in claim 5, wherein:

said microprocessor includes means for repetitively clocking the sampling of input signals to form separate said sums of applied forces for comparison with said threshold values.

8. Apparatus as described in claim 5 or 6 or 7, wherein:

said means for comparison is provided with a plurality of ascending threshold values for comparison against said sum of forces, each threshold, if exceeded, indicating that a quantity or quality of a variable associated with said sum of forces at a given locus on said display means is intended.

9. Apparatus as described in claim 1 or 2 or 3 or 4 or 5 or 6 or 7 further comprising:

physical orientation sensor means connected to said display means to sense changes in the orientation of said uniaxial axis of said display means and to provide an electrical output signal responsive thereto, said electrical output being connected to said electrical signal processing means.

10. In a touchsensitive display apparatus having an electrical processing means for analyzing outputs from electrical sensors indicative of touch forces on said display, the improved method of discriminating between actual touch signals and offset or spurious signals, comprising steps of:

storing a first fixed threshold value;

comparing total force signal values with said first fixed threshold value and, if said force value is less than said first fixed threshold value, storing said force value as an offset or spurious signal value;

storing a second fixed threshold value;

comparing the total force signal value with said second fixed threshold value and, if said force value exceeds said second fixed threshold value, identifying said force signal as a touch signal; and storing a third fixed threshold value;

and comparing the total force signal value with said third fixed threshold value and, if said force value exceeds said third fixed threshold value, calculating a fraction of said force value and storing it as a dynamic threshold value for subsequent comparison against a succeeding force value.

11. The method as described in claim 10, further including a step of:

subtracting said offset value from said total force signal value to yield a corrected force signal for output.

12. Apparatus as described in claim 9 wherein:

said electrical signal processing means controlling the sensing and forced calibration of said strain sensors.

* * * * *